United States Patent
Gould et al.

(10) Patent No.: US 6,578,435 B2
(45) Date of Patent: Jun. 17, 2003

(54) CHEMICALLY INERT FLOW CONTROL WITH NON-CONTAMINATING BODY

(75) Inventors: Chuck Gould, Minneapolis, MN (US);
Jane Lanctot, Minneapolis, MN (US);
Jerry Cucci, Minneapolis, MN (US);
Tom Peterson, Chanhassen, MN (US);
Dan Wink, Maple Grove, MN (US);
Bob Chinnock, Victoria, MN (US)

(73) Assignee: NT International, Inc., Fridley, MN (US)

( * ) Notice: Subject to any disclaimer, the term of this patent is extended or adjusted under 35 U.S.C. 154(b) by 0 days.

(21) Appl. No.: 09/447,984

(22) Filed: Nov. 23, 1999

(65) Prior Publication Data

US 2003/0061888 A1 Apr. 3, 2003

(51) Int. Cl.$^7$ .............................. G01F 1/37; E03B 1/00
(52) U.S. Cl. ......................... 73/861.52; 137/2; 137/487
(58) Field of Search .................... 73/861.52, 861.47; 137/2, 7, 8, 9, 486, 487, 487.5

(56) References Cited

U.S. PATENT DOCUMENTS

| | | |
|---|---|---|
| 2,190,713 A | 2/1940 | Hintze et al. |
| 2,734,526 A | 2/1956 | Aagard |
| 3,645,139 A | 2/1972 | Zavoda |
| 3,930,823 A | 1/1976 | Kurtz et al. |

(List continued on next page.)

FOREIGN PATENT DOCUMENTS

| | | |
|---|---|---|
| EP | 0990885 A2 | 9/1999 |
| JP | 5-33044 U | 10/1991 |
| JP | 07072029 A | 6/1994 |
| JP | 06201063 | 7/1994 |
| JP | 2552093 | 11/1996 |
| JP | 3-97639 | 9/2000 |

OTHER PUBLICATIONS

Published Article: *A Code High–vacuum Seal without Gaskets,* Lloyd Manebo, University of California, Lawrence Radiation Laboratory, Livermore, California, Contract No. W–7405–eng–48, Sep. 1, 1962.
Published Article: *Development of a High Temperature Capacitive Pressure Transducer,* R. L. Egger, NASA Lewis Center, Contract NAS 3–19556. Oct. 1977.
Published Article: *Quartz Capsule Pressure Transducer for the Automotive Industry,* C.Y. Lee and J.L. Pfeifer, SAE Technical Paper Series, No. 810374. Feb. 1981.
Published Article: *Small Sensitive pressure transducer for use at low temperatures,* W. Griffioen and G. Frossati, Rev. Sci. Instrum, 56 (6), Jun. 1985, pp. 1236–1238.
Article: *A Balanced Resonant Pressure Sensor,* Erik Stemme and Goran Stemme, Sensors and Actuators A, 21–A23 336–341. Feb. 1990.
Article: *Diversity and Feasibility of direct bonding: A survey of a dedicated optical technology,* Applied Optics, vol. 33, No. 7, (Mar. 1, 1994) 1154–1169.

*Primary Examiner*—Harshad Patel
(74) *Attorney, Agent, or Firm*—Patterson, Thuente, Skaar & Christensen, P.A.

(57) ABSTRACT

A fluid control module that may be connected in-line within a chemically corrosive or ultra pure fluid flow circuit that delivers fluids in either a liquid or gaseous state. The fluid control module of the present invention may be utilized to control the flow, pressure or volume of fluid flowing through the fluid flow circuit and is capable of automatically adjusting or "calibrating" the module to compensate for changes in atmospheric pressure or drift in the pressure sensors of the fluid control module. The fluid control module also includes a rapid or macro adjustment of the control valve to reach the desired flow rate at a quicker pace.

71 Claims, 9 Drawing Sheets

U.S. PATENT DOCUMENTS

| | | |
|---|---|---|
| 4,010,769 A | 3/1977 | Lorenzo et al. |
| 4,192,192 A | 3/1980 | Schnell |
| 4,322,980 A | 4/1982 | Suzuki et al. |
| 4,343,456 A | 8/1982 | Zitzloff |
| 4,461,181 A | 7/1984 | North |
| 4,507,973 A | 4/1985 | Barr et al. |
| 4,600,912 A | 7/1986 | Marks et al. |
| 4,653,330 A | 3/1987 | Hedkke |
| 4,683,755 A | 8/1987 | Samek |
| 4,774,843 A | 10/1988 | Ghiselin et al. |
| 4,790,821 A | 12/1988 | Stines |
| 4,994,781 A | 2/1991 | Sahagen |
| 5,063,784 A | 11/1991 | Ridenour |
| 5,167,158 A | 12/1992 | Kamachi et al. |
| 5,174,926 A | 12/1992 | Sahagen |
| 5,183,078 A | 2/1993 | Sorrell |
| 5,184,514 A | 2/1993 | Cucci et al. |
| 5,207,102 A | 5/1993 | Takahashi et al. |
| 5,316,035 A | 5/1994 | Collins et al. |
| 5,349,492 A | 9/1994 | Kimura et al. |
| 5,357,792 A | 10/1994 | Gatenby |
| 5,410,916 A | 5/1995 | Cook |
| 5,445,035 A * | 8/1995 | Dalajoud ................. 73/861.52 |
| 5,524,492 A | 6/1996 | Frick et al. |
| 5,563,347 A | 10/1996 | Martin et al. |
| 5,604,315 A | 2/1997 | Briefer et al. |
| 5,653,191 A | 8/1997 | Calhoun et al. |
| 5,654,512 A | 8/1997 | Harnett et al. |
| 5,656,780 A | 8/1997 | Park |
| 5,657,001 A | 8/1997 | Wilson |
| 5,731,522 A | 3/1998 | Sittler |
| 5,822,173 A | 10/1998 | Dague et al. |
| 5,861,546 A * | 1/1999 | Sagi et al. ............... 73/861.52 |
| 5,865,205 A * | 2/1999 | Wilmer ........................ 137/2 |
| 5,878,000 A | 3/1999 | Dubois |
| 5,925,829 A | 7/1999 | Laragione et al. |
| 6,152,162 A * | 11/2000 | Balazy et al. ................ 137/110 |

* cited by examiner

CHEMICALLY INERT FLOW CONTROL WITH NON-CONTAMINATING BODY

FIELD OF THE INVENTION

This invention relates generally to fluid controls and more particularly relates to a chemically inert fluid control module that may be connected in-line within a chemically corrosive fluid flow circuit that delivers fluids in either a liquid or gaseous state. The fluid control module of the present invention may be utilized to control the flow, pressure or volume of fluid flowing through the fluid flow circuit and is capable of automatically adjusting or "calibrating" the module to compensate for changes in atmospheric pressure or drift in the pressure sensors of the fluid control module.

BACKGROUND OF THE INVENTION

Caustic fluids are frequently used during ultra pure processing of sensitive materials. The susceptibility to contamination of the sensitive materials during the manufacturing process is a significant problem faced by manufacturers. Various manufacturing systems have been designed to reduce the contamination of the sensitive materials by foreign particles and vapors generated during the manufacturing process. The processing of the sensitive materials often involves direct contact with caustic fluids. Hence, it is critical that the caustic fluids are delivered to the processing site in an uncontaminated state and without foreign particulate. Various components of the processing equipment are commonly designed to reduce the amount of particulate generated and to isolate the processing chemicals from contaminating influences.

The processing equipment typically includes liquid transporting systems that carry the caustic chemicals from supply tanks through pumping and regulating stations and through the processing equipment itself. The liquid chemical transport systems, which includes pipes, tubing, monitoring devices, sensing devices, valves, fittings and related devices, are frequently made of plastics resistant to the deteriorating effects of the caustic chemicals. Metals, which are conventionally used in such monitoring devices, cannot reliably stand up to the corrosive environment for long periods of time. Hence, the monitoring and sensing devices must incorporate substitute materials or remain isolated from the caustic fluids.

The processing equipment commonly used in semiconductor manufacturing has one or more monitoring, valving, and sensing devices. These devices are typically connected in a closed loop feedback relationship and are used in monitoring and controlling the equipment. These monitoring and sensing devices must also be designed to eliminate any contamination that might be introduced.

In order to control the flow or pressure within the liquid transporting system, the transporting equipment may utilize information obtained from each of the monitoring, valving and sensing devices. The accuracy of the information obtained from each of the devices may be affected by thermal changes within the system. Further, the inaccuracy of one device may compound the inaccuracy of one of the other devices that depends upon information from the one device. Further, frequent independent calibration may be required to maintain the accuracy of each individual device, however, independent calibration of the devices may prove difficult and time consuming.

Hence, there is a need for a non-contaminating fluid control module which may be positioned in-line within a fluid flow circuit carrying corrosive materials, wherein the module is capable of determining the rate of flow based upon a pressure differential measurement taken in the fluid flow circuit, and wherein the determination of the rate of flow is not adversely affected by thermal changes within the fluid flow circuit, and wherein calibration of the pressure sensors of the fluid control module does not require ancillary or independent calibration of the valve. A need also exists for a fluid control module that avoids the introduction of particulate, unwanted ions, or vapors into the flow circuit. The present invention meets these and other needs that will become apparent from a review of the description of the present invention.

SUMMARY OF THE INVENTION

The present invention provides for a fluid control module that may be coupled in-line to a fluid flow circuit that transports corrosive fluids, where the fluid control module may determine pressure and flow rates and control the pressure, flow or volume within the fluid flow circuit. The rate of flow may be determined from a differential pressure measurement taken within the flow circuit. The fluid control module compensates for changes of temperature within the fluid flow circuit and provides a zeroing feature which compensates for differences in pressure when the fluid is at rest and negates the affects of the valve upon the system. In the preferred embodiment, the components of the fluid control module include a housing having a chemically inert fluid conduit, an adjustable control valve coupled to the conduit, pressure sensors coupled to the conduit, and a constriction disposed within the conduit having a reduced cross-sectional area to thereby restrict flow of fluid within the conduit and allow for reliable flow measurement. The chemically inert housing encloses the control valve and the pressure sensors.

When two pressure sensors are provided, the constriction is positioned between the two pressure sensors within the fluid flow conduit. As described in greater detail below, the fluid control module of the present invention having two pressure sensors provides for bi-directional fluid flow and may be coupled in line to adjacent ancillary equipment. In an alternate preferred embodiment, the fluid control module includes only one pressure sensor, wherein the constriction within the fluid conduit must be positioned downstream of the pressure sensor and valve. Also, the fluid control module having a single pressure sensor must be spaced apart a predetermined distance from ancillary equipment connected in line to the fluid flow circuit.

The drive or actuation of the control valve may be driven either mechanically, electrically or pneumatically by a driver having a known suitable construction and the valving components within the control valve may take on any of several suitable known configurations, including without limitation a poppet, diaphragm, redundant diaphragm, weir valve and/or pinch valve, wherein the components in direct contact with the fluid of the fluid flow circuit are constructed from chemically inert materials.

A controller or integrated circuit may be electrically coupled to the control valve and pressure sensor or sensors. The controller may produce a signal proportional to a fluid flow rate within the fluid conduit and/or a signal proportional to a pressure within the fluid conduit. The controller may control the pressure, rate of flow, or volume such that a desired set point is maintained. The set point may be defined by the user or automatically determined by the controller (for example, during a macro adjustment of the control valve). Further, the controller may adjust the fluid flow rate signal or pressure signal dependant upon changes in atmospheric or fluid pressure. Also, the controller may include a means for macro and micro adjustment of the control valve in response to changes in internal fluid or atmospheric pressure and may re-zero the pressure sensors when flow within the fluid flow circuit stops.

The housing that encloses the control valve and pressure sensors includes a bore extending therethrough, which forms a passage or conduit through which fluids flow, when the housing is connected in-line in a fluid flow circuit. Aligned and sealably connected to the opposed open ends of the bore are pressure fittings. The pressure fittings are constructed from a chemically inert material and are readily available and known to those skilled in the art.

In an embodiment of the present invention the housing has two pressure transducer receiving cavities extending from an external surface thereof, wherein each such cavity communicates independently with the bore. An isolation member may prevent the fluid flow from contacting the pressure transducer receiving cavities. The isolation members may be molded integral with the housing or may be removable. The bore tapers to a constricting region located between the two cavities. The restricted region results in a pressure drop within the bore across points adjacent the two cavities. This change in pressure may be detected by pressure sensor transducers placed within each of the two cavities. The rate of flow may be determined from the drop in pressure. The determination of the rate of flow using the two pressure sensors is described below in greater detail.

A hybrid or fully integrated electronic circuit disposed in the housing is operatively coupled to both pressure sensor transducers and the control valve. The electronic circuit develops a signal that is a measure of the rate of flow within the flow circuit from information sensed by the pressure sensors. Further, the electronic circuit may develop a signal corresponding to one or the other of the downstream or upstream static pressures within the fluid flow circuit, such that the orientation of the flow meter within the flow circuit is interchangeable and the direction of flow may be indicated by comparing the sensed pressure from each pressure sensor. When sensing the static pressures of gases flowing through the flow circuit, a correction may be made to the sensed pressures to correct for non-linearity and flow rates as a result of gas density and compressibility differences and effects.

This electronic circuit may also be used in combination with temperature sensitive components to adjust the pressure measurement associated with each cavity based upon temperature changes within the flow circuit. Further, the electronic circuit or controller may allow for zeroing of the pressure sensors and valve control. The electronic circuit is coupled by electrical leads to an electrical connector and power may be transmitted to the electronic circuit through the electrical leads connected to an external power supply. Further, an analog output such as a standard 4–20 milliamps signal, voltage output, or digital protocol proportional to the calculated rate of flow may be transmitted through additional electrical leads to a display or external controller.

The isolation membrane, pressure sensor, sealing members, spacer ring and hold down ring may be contained within each cavity of the housing. These components and variations thereof are described in greater detail in U.S. Pat. Nos. 5,869,766 and 5,852,244 which are assigned to the same assigns as the present application, the entire disclosure of which is incorporated herein by reference. In a further alternate embodiment, inert sapphire pressure transducers are positioned within respective cavities and in direct contact with the fluid flow, thereby eliminating the isolation membrane.

In use, the fluid control module is coupled in line to a fluid flow circuit. The pressure sensors may be pre-calibrated or the sensors may be calibrated at the time of interconnection with the fluid flow circuit. When calibrating the pressure sensors, the valve may be actuated between an open and closed position. When the pressure sensors indicate that flow has stopped, the output required to actuate the valve may be noted and thereby define an approximation of the closed position of the valve. Various set points may be identified to identify the valve position at various pressures, temperatures and flow rates. The calibration of a single pressure sensor will be described below in greater detail.

Once the flow meter is calibrated, the user may then select whether to control pressure, flow or volume within the fluid flow circuit. If pressure is controlled, the pressure and/or rate of flow is monitored and the valve is accordingly adjusted until a desired set point is reached. If flow is controlled, the pressure and/or flow is monitored and the valve is actuated until the desired set point is reached. The volume of fluid flowing through the fluid conduit may be controlled by monitoring both the pressure and rate of flow and accordingly adjusting the control valve to produce the desired volume of fluid flow. For example, the user may determine that 2 milliliters of fluid is desired. The valve is opened and the pressure and flow rates are monitored, such that it may be determined when 2 milliliters of fluid have passed through the module, wherein the control valve then closes terminating the fluid flow.

When flow is controlled, the controller may store in memory the output of the control valve driver required to obtain a certain flow. In this manner, when the user selects a desired flow, the controller sets the output of the driver approximately equal to an output that previously resulted in the desired flow rate (the macro adjust). Then controller may then manipulate or "fine tune" the control valve to precisely obtain the desired flow rate (the micro adjust). When the flow through the module is terminated by closing the control valve, the controller may then automatically adjust or re-zero the pressure sensors such that the difference between the measured pressures of the two pressure sensors is zero. In this manner, inaccuracy due to thermal changes and sensor drift is avoided. In an alternate preferred embodiment, a second valve is provided, wherein the second valve is a dedicated open/close valve. The output of the controller or electronic circuit may be delivered to an external controller or display.

The advantages of the present invention will become readily apparent to those skilled in the art from a review of the following detailed description of the preferred embodiment especially when considered in conjunction with the claims and accompanying drawings in which like numerals in the several views refer to corresponding parts.

DETAILED DESCRIPTION

Figure 1:
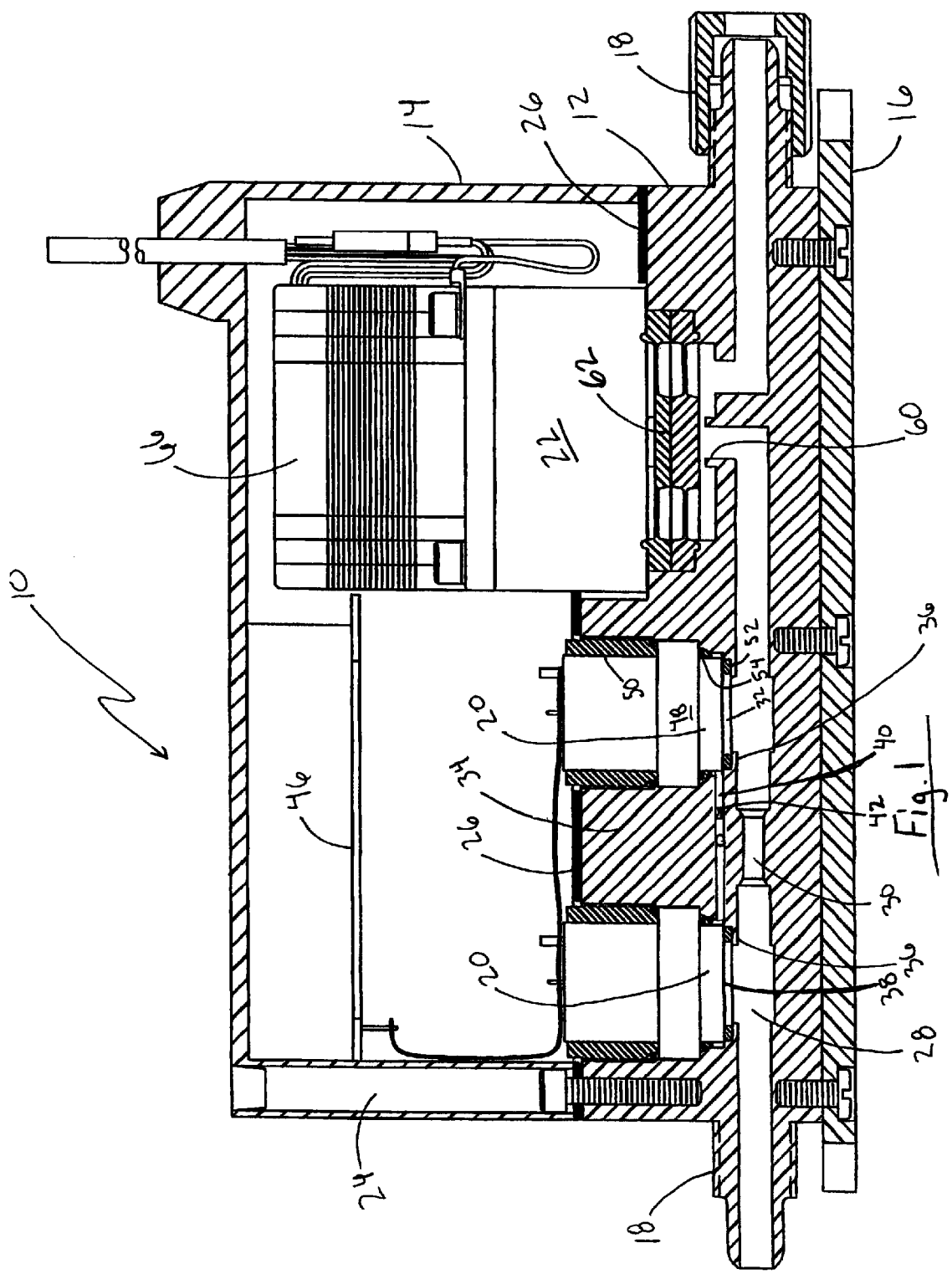
FIG. 1 is a partial sectional side elevational view of the fluid control module of the present invention.

The present invention represents broadly applicable improvements to chemically inert fluid controls. The embodiments detailed herein are intended to be taken as representative or exemplary of those in which the improvements of the invention may be incorporated and are not intended to be limiting. Referring first to FIG. 1 the fluid control module is generally identified by numeral 10. The fluid control module 10 generally includes a rectangular housing consisting of a housing body 12 and housing cover 14, mounting plate 16, pressure inlet/outlet fittings 18, pressure transducers 20 and control valve 22. The housing body 12 and housing cover 14 are preferably manufactured from a chemically-inert, non-contaminating polymer such as polytetrafluoroethylene (PTFE). The cover 14 has bores 24 extending through it for mounting the cover 14 to the housing 12 with appropriate screws. A gasket of known suitable construction is preferably positioned between the cover and housing to allow the cover 14 to be sealed to the housing 12. Without any limitation intended, a gasket or seal manufactured from a multi-layer fabric, sold under the GOR-TEX trademark by W.L. Gore & Assoc., Inc., allows venting of an internal area of the housing 12 for true atmospheric pressure reference, while restricting the flow of liquids into the internal area of the housing 12.

A longitudinal bore 28 extends through the housing 12 forming a conduit. Thus, when the fluid control module 10 is connected in-line with a fluid flow circuit, via pressure fittings 18, the bore 28 serves as the fluid flow passage within the fluid flow circuit. The orientation of the fluid control module 10, within the fluid flow circuit, may be reversed without affecting its effectiveness. A constricting area 30 is formed in the bore 28 between the two pressure sensors 20 to create a pressure drop as the fluid flow traverses the constricting area or orifice 30.

In the preferred embodiment, cylindrical cavities 32 extend from an outer surface of the housing 12 to the bore 28. Those skilled in the art will appreciate that cavities 32 may each extend into the housing from different sidewalls of the housing. The two cavities 32 are separated a predetermined distance by dividing wall 34. Near the region within the housing where each cavities 32 and bore 28 intersect, an annular lip 36 is formed. Each lip 36 surrounds and further defines the opening to each cavity 32 from the bore 28. A thin flexible polymer disk or isolation membrane 38 is positioned on the lip 36 of each cavity 32. Without limitation, the membrane is preferably constructed to have a thickness in a range between 0.001 and 0.040 inches. Preferably, the flexible membrane 38 is manufactured from fluorocarbon polymers. One such tetrafluoroethylene fluorocarbon polymer is sold under the TEFLON trademark by E. I. duPont Nemours. Alternatively, the isolation member 38 may be molded integral with the housing 12 to form a thin wall separating the cavity 32 and bore 28.

Each pressure transducer 20 is held in place within their respective cavities 32 by spacer ring 48 and externally threaded hold down ring 50. The isolation membranes 38 and transducers 20 are sealed within the housing 12 by chemically inert o-ring seals 52. A redundant seal is created by the positioning of o-ring 54. The seals 52 and 54 are readily available and of known construction to those skilled in the art.

A drain or conduit 40 may be formed extending through the housing 12 into each cavity 32 between the redundant seals 52 and 54, thereby draining the area between the redundant seals. In this manner, the drain acts as a drainage, passageway or outlet, in the event that fluids leak past seal 52 from the fluid flow circuit. A sensor 42 may be positioned within the drain 40 and electrically connected (by leads not shown) to integrated circuit or controller 46. Those skilled in the art will appreciate that a conductive sensor, capacitive sensor or non-electric fiber optic sensor may equally be used to sense the presence of fluids in the drain 40. When fluid leaks past the first seal, the fluid activates the sensor 42, thereby transmitting a signal to the electric circuit 46 which subsequently sets off a leak indicator. The redundant sealing arrangement helps prevent exposure of the pressure transducer 20 and controller 46 from the potential damaging affects of the caustic fluids. The redundant seal also further isolates the fluid flow, thereby reducing the potential contamination of the fluids.

Each pressure sensor 20 may be of a capacitance type or piezoresistive type known to those skilled in the art. The base of each pressure sensor is in direct contact with the membrane 38 and may be either in pressure contact with or bonded to the membrane by an adhesive, thermal welding or by other known suitable fixation. In an alternate embodiment, an alumina ceramic pressure sensor may be used, wherein the alumina ceramic pressure sensor comprises a thin, generally compliant ceramic sheet having an insulating spacer ring sandwiched between a thicker, non-compliant ceramic sheet. The first thin ceramic sheet or diaphragm is approximately 0.005 to 0.050 inches in thickness with a typical thickness of 0.020 inches. The thicker ceramic sheet has a thickness range between 0.100 to 0.400 inches. The spacer ring may be constructed of a suitable material such as a glass, polymer or alternatively the ceramic sheets may be brazed together. The opposed faces of ceramic disks are metalized by metals such as gold, nickel or chrome to create plates of a capacitor. A similar capacitive pressure transducer is described by Bell et al. in U.S. Pat. 4,177,496 (the '496 patent). Other capacitive pressure transducers similar to that described in the '496 patent are available and known in the art. It is contemplated that the flexible membrane 38 could be eliminated if the pressure sensor used is of the sapphire capacitive pressure transducer type. A sapphire capacitive or sapphire piezoresistive transducer type is inert, and is resistant to wear when subjected to caustic fluids. Having a sapphire sensor in direct communication with the fluid flow may further enhance the pressure measurements of each transducer.

The controller 46 may be in any of several forms including a dedicated state device or a microprocessor with code, and may include Read Only Memory (ROM) for storing programs to be executed by the controller and Random Access Memory (RAM) for storing operands used in carrying out the computations by the controller. The controller 46 is electrically coupled to a power supply and manipulates the electrical circuitry for sensing pressure and controlling the actuation of the control valve, wherein flow, pressure and/or volume may be controlled.

The controller 46 is used to convert the pressure readings from the two pressure transducers 42 and 44 to an analog or digital representation of flow or, alternatively, a pressure reading of the downstream pressure transducer. The raw analog signal from the upstream transducer is supplied to an input terminal and, likewise, the raw analog transducer output signal from the downstream transducer is supplied to an input terminal. The controller 46 computes the instantaneous pressure differences being picked up by the upstream and downstream transducers and performs any necessary zeroing adjustments and scaling.

It is known that, in steady-state flow, the flow rate is the same at any point. The flow rate (I) may be expressed as $I_m = \rho v A$. Where $\rho$ represents the density of the fluid, $v$ represents the velocity of the fluid, and A represents the area through which the fluid travels. Using the continuity equation $A_1 v_1 = A_2 v_2$, the rate of flow within the fluid control module 10 may be found equal to a constant multiplied by $\sqrt{P_1 - P_2}$. The controller 46 thus computes the pressure and rate of flow from the data received from the two pressure sensors. Those skilled in the art will recognize that with laminar flow, the rate of flow approximates more closely a constant multiplied by $P_1 - P_2$. Hence, a low flow limit could be built into the system, such that if the "Reynolds number" is below a certain threshold, the flow meter identifies the flow rate as zero. The controller 46 may then convert the computed rate of flow into a digital signal or an analog signal falling in the range of from 4 mA to 20 mA for use by existing control systems.

As fluid flows through the flow circuit, the pressure adjacent each of the two cavities is detected by the controller 46, whereby the rate of flow may be calculated from the two detected pressures. The gauge pressure or absolute pressure may equally be used. Those skilled in the art will recognize that the flow rate may be calibrated so that minimum desired output values are associated with minimum pressure and maximum desired output pressures are associated with maximum pressure. For example, a pressure sensor intended to measure 0 to 100 psig (pounds per square inch gauge) can be calibrated to read 4 mA (milliamps) at 0 psig and 20 mA at 100 psig.

Figure 2:
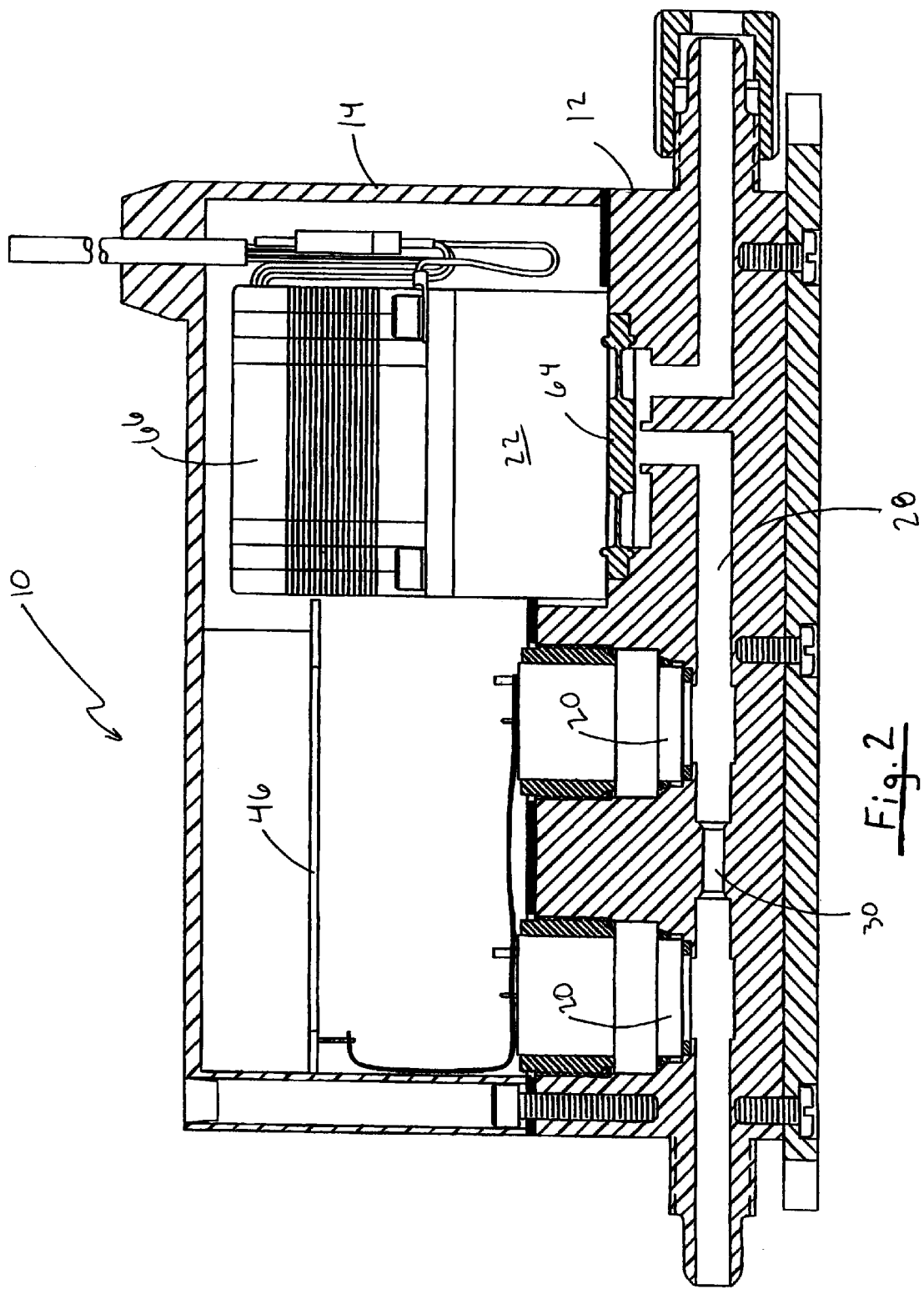
FIG. 2 is a partial sectional side elevational view of an alternate embodiment of the fluid control module of the present invention.

The conduit 28 interconnects with the control valve 22, wherein a valve seat 60 is formed within the fluid conduit. A double diaphragm 62 is actuated fore and aft, wherein when the diaphragm is actuated into engagement with the valve seat 60, fluid flow past the valve seat is terminated. Alternatively, a single diaphragm may be utilized to control the flow of fluid past the valve seat 60 (see FIG. 2). Those skilled in the art will appreciate that the double diaphragm 62 is unaffected by changes in atmospheric pressure. The driver 66 shown in FIG. 1 used to actuate the diaphragm 62 is of the electric motor type. Those skilled in the art will appreciate that the actuation of the valve between the open and closed position may be accomplished with any of several mechanical electrical or pneumatic drivers of known suitable construction. Further, without limitation, the mechanism for opening and closing flow may comprise for example, a diaphragm, poppet, weir valve, or pinch valve with the diaphragm and valve seat being preferred.

Figure 3:
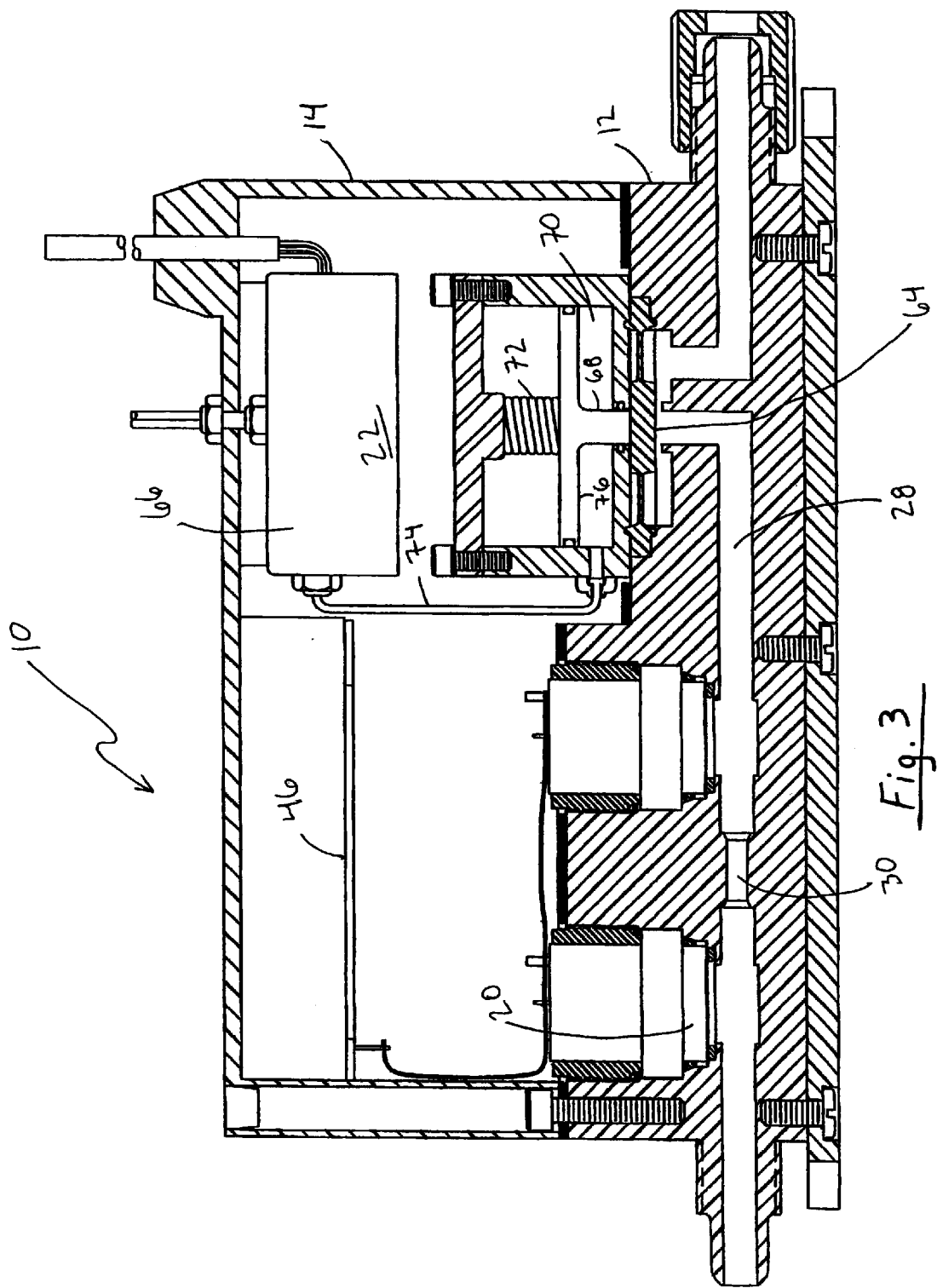
FIG. 3 is a partial sectional side elevational view of an alternate embodiment of the fluid control module of the present invention having a pneumatic actuated valve.
Figure 4:
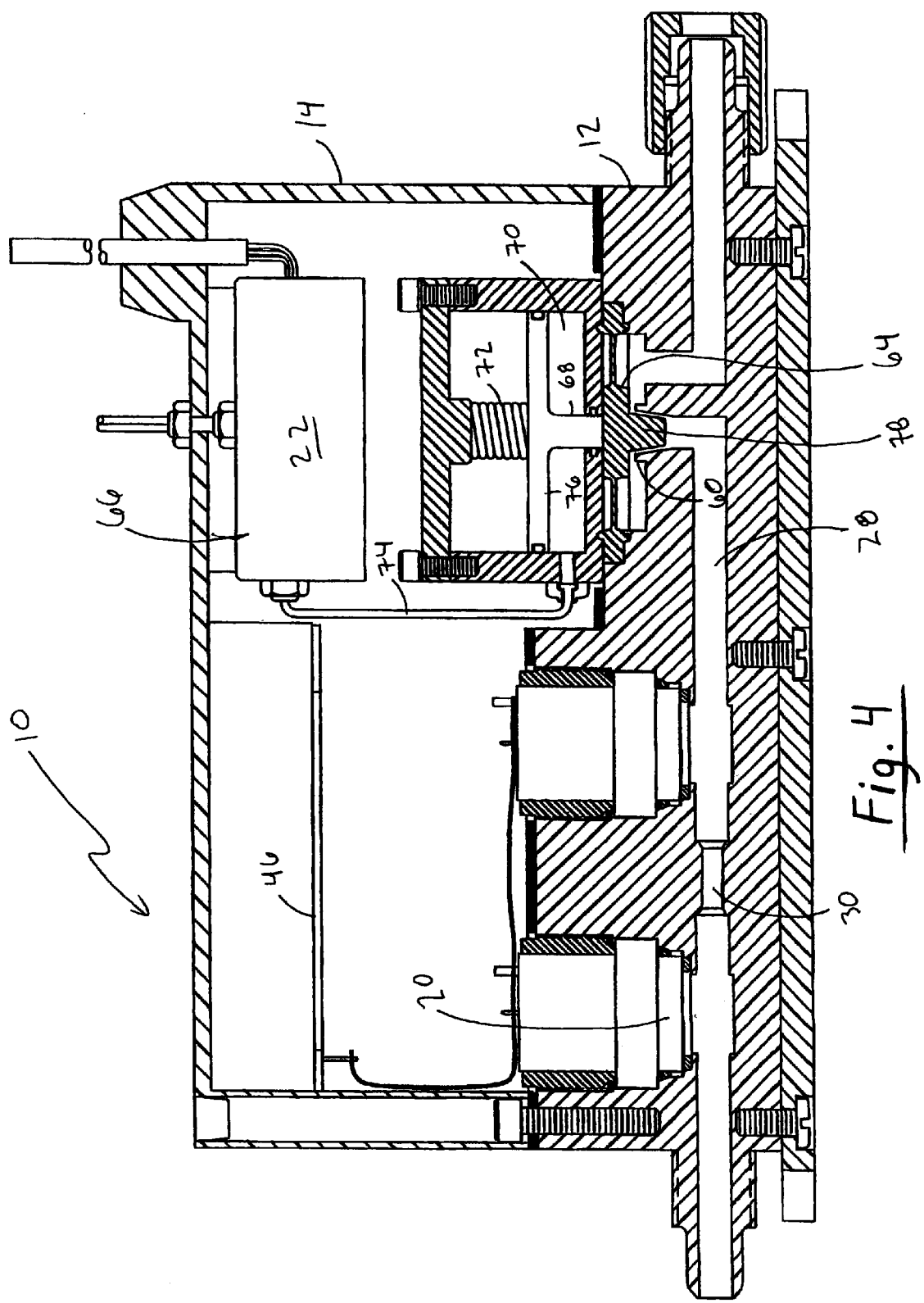
FIG. 4 is a partial sectional side elevational view of an alternate embodiment of the fluid control module of the present invention.
Figure 5:
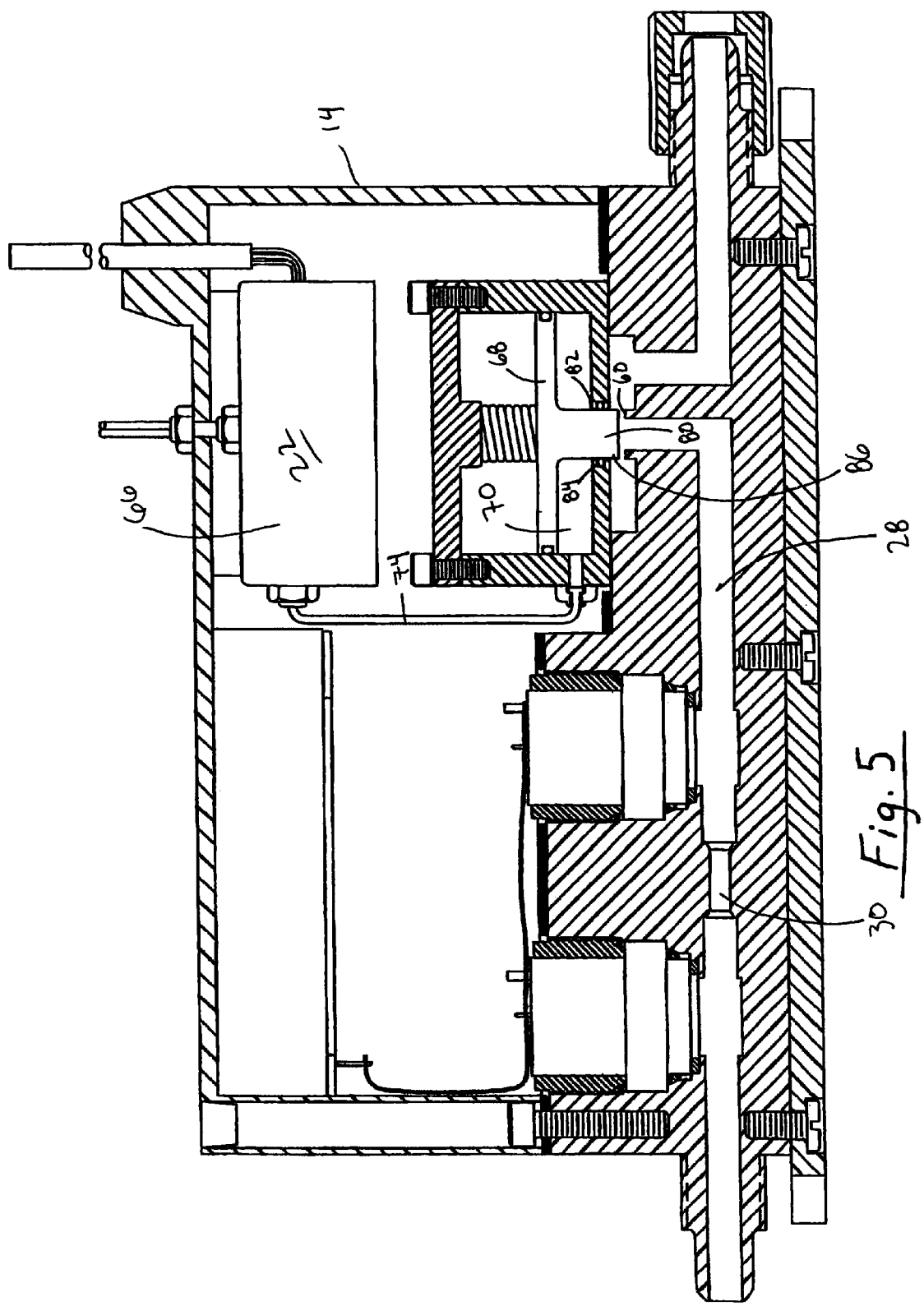
FIG. 5 is a partial sectional side elevational view of an alternate embodiment of the fluid control module of the present invention.
Figure 6:
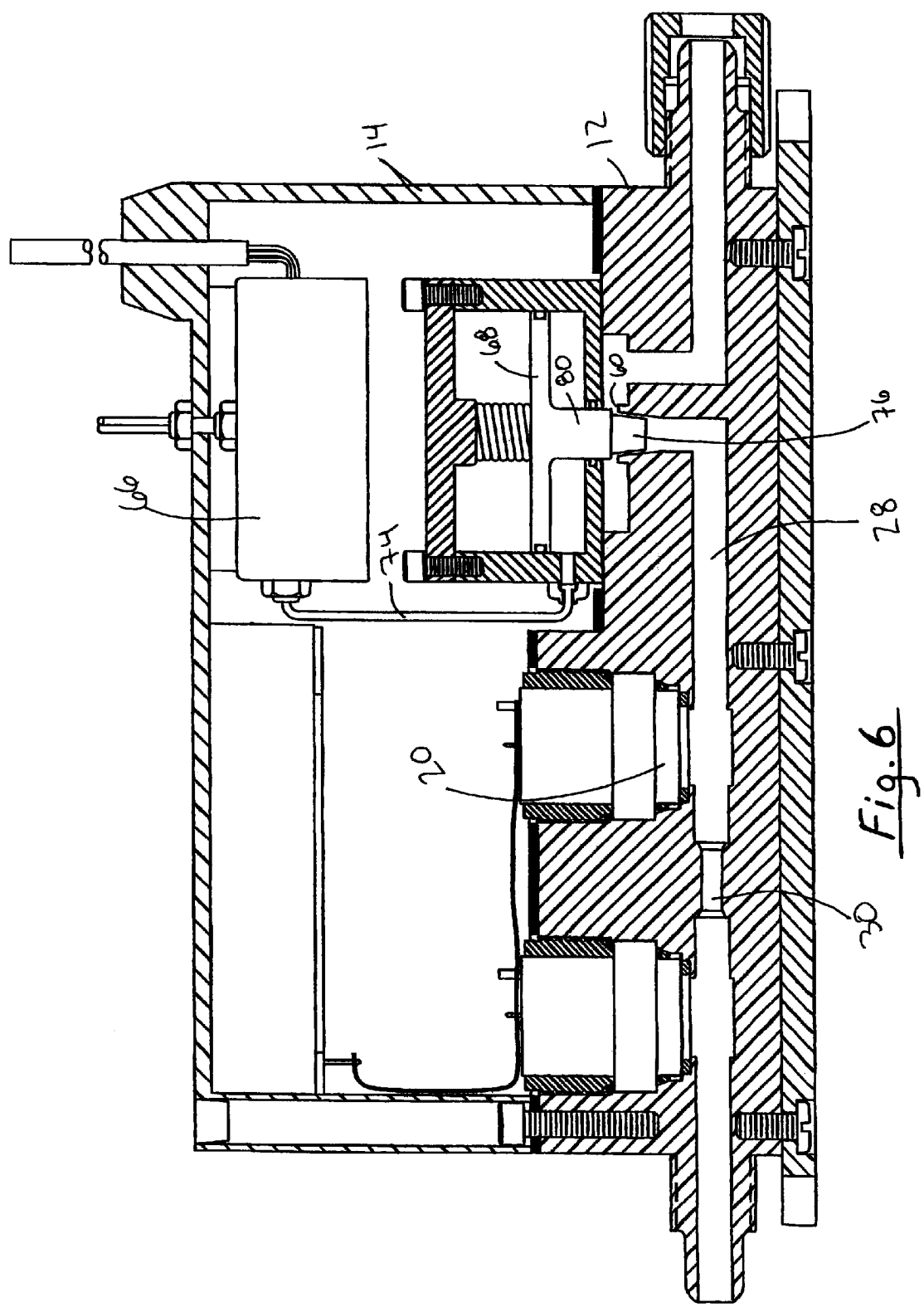
FIG. 6 is a partial sectional side elevational view of an alternate embodiment of the fluid control module of the present invention.

FIG. 3 illustrates an alternate embodiment of the driver 66 being of the pneumatic type. A piston 68 is sealed within a sealed chamber 70, wherein the mechanical force of a compression spring 72 forces the piston 68 in a downward or first direction and a pressurized air line 74 increases the pressure on the lower end 76 of the piston to force the piston 68 upward thereby compressing the spring 72. In this manner, the air pressure within the chamber 70 may be increased or decreased a controlled amount to actuate the piston 68 and thus the diaphragm 64 attached to the piston 68 between an open and closed position. The lower end of the diaphragm 64 may include a conical member 78 extending therefrom which may enhance the sealing between the valve seat 60 and the diaphragm 64 (see FIG. 4). Alternatively, a valve stem 80 extending from the piston 68 may extend through the chamber wall 82 through a bore 82 having a seal 84 to seal the air chamber 70 and provide for fore and aft motion of the valve stem 80 within the bore 82 (see FIG. 5). The lower end 86 of the valve stem 80 seals directly with the valve seat 60 when in the closed position. The lower end 86 may be tapered to further enhance the sealing between the valve stem 80 and the valve seat 60 when in the closed position (see FIG. 6).

Figure 7:
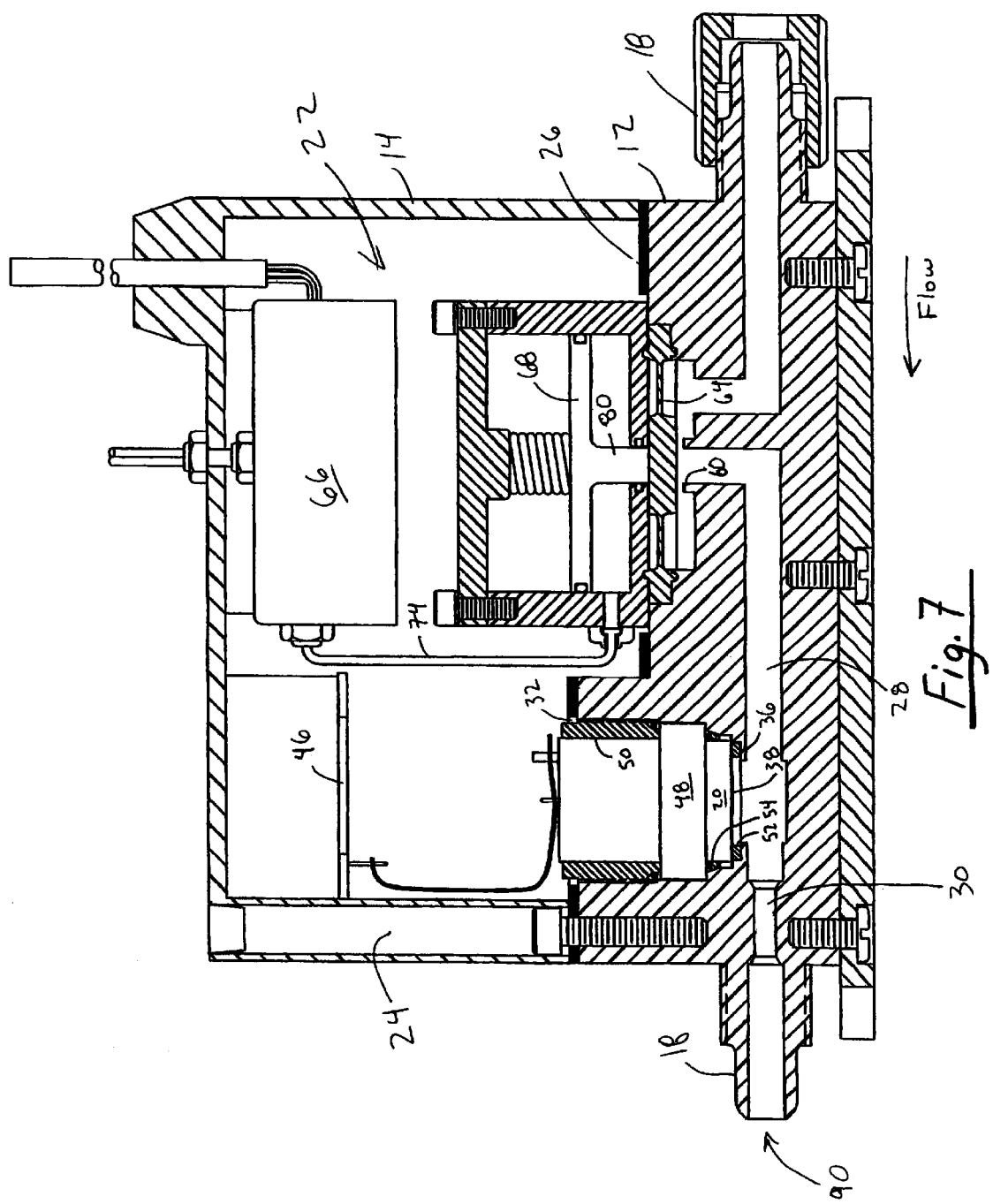
FIG. 7 is a partial sectional side elevational view of an alternate embodiment of the fluid control module of the present invention having a single pressure sensor.
Figure 8:
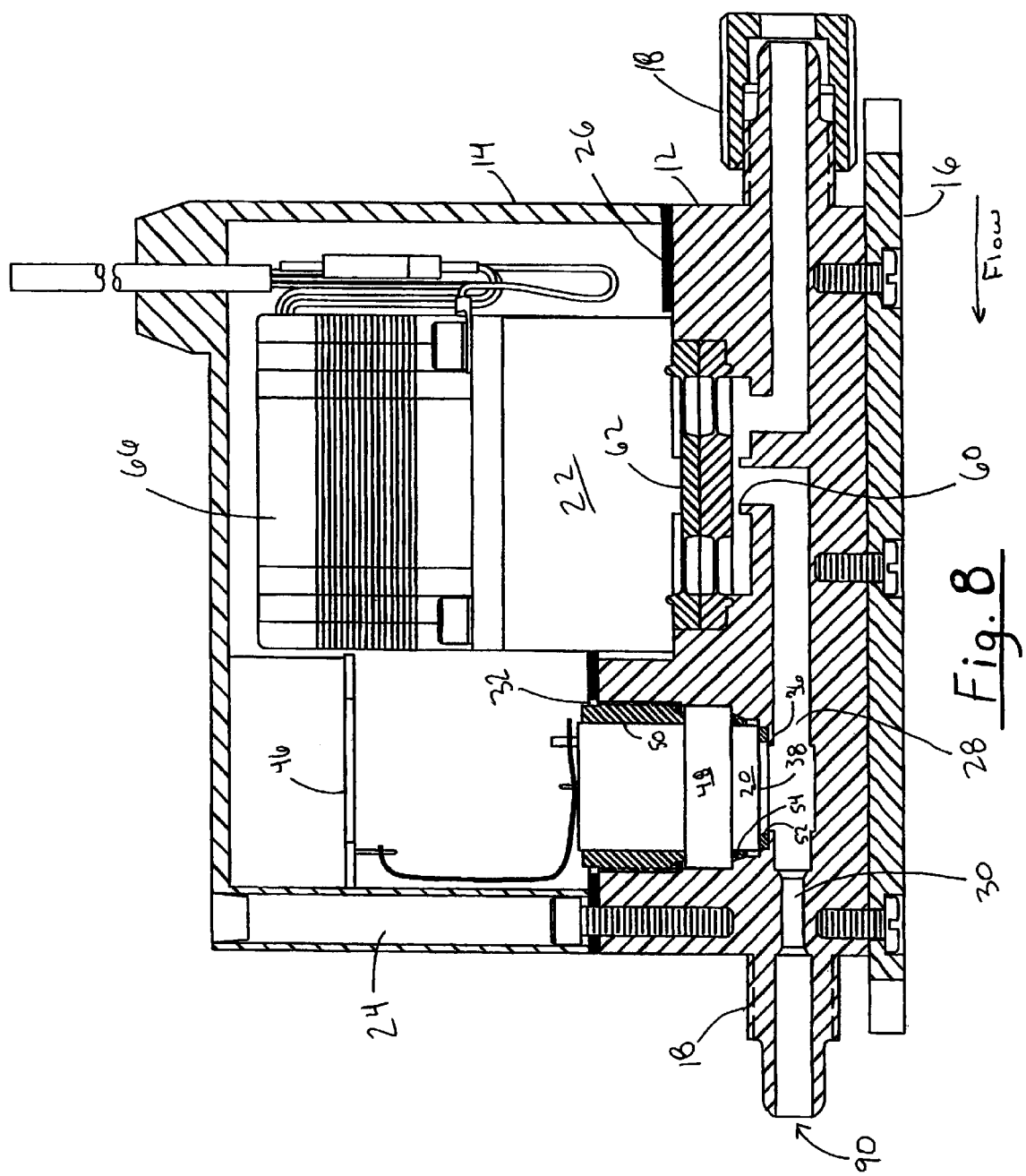
FIG. 8 is a partial sectional side elevational view of an alternate embodiment of the fluid control module of the present invention having a single pressure sensor.

Referring to FIGS. 7 and 8 alternate embodiments of the fluid control module 10 are shown having a single pressure sensor for determining flow rates within the fluid flow conduit. The control valve 22 shown in FIG. 7 is pneumatically driven as described above in greater detail. The control valve 22 shown in FIG. 8 is actuated by the motor 66 as described above in greater detail. When determining flow rates with the fluid control module of the type shown in FIGS. 7 and 8, the orifice 30 must be downstream of the pressure sensor 20 and control valve 22 and the output end 90 of the fluid control module 10 must be connected to a conduit, tubing, void, or other pathway wherein the pressure therein is at atmospheric pressure (a known constant). In this manner the flow rate may be determined as described above, wherein the pressure P on the downstream side of the orifice is a constant. Additionally, a tubing of known length and diameter may be coupled to the output end 90 of the fluid control module 10, whereby the pressure difference between the pressure at the output end 90 and the pressure within the tubing is constant. In use, the tubing may be filled with fluid and then the control valve 22 may be shut. The pressure sensor is then calibrated to indicate zero pressure. When the control valve is opened, then the pressure sensor will indicate the change in pressure.

Figure 9:
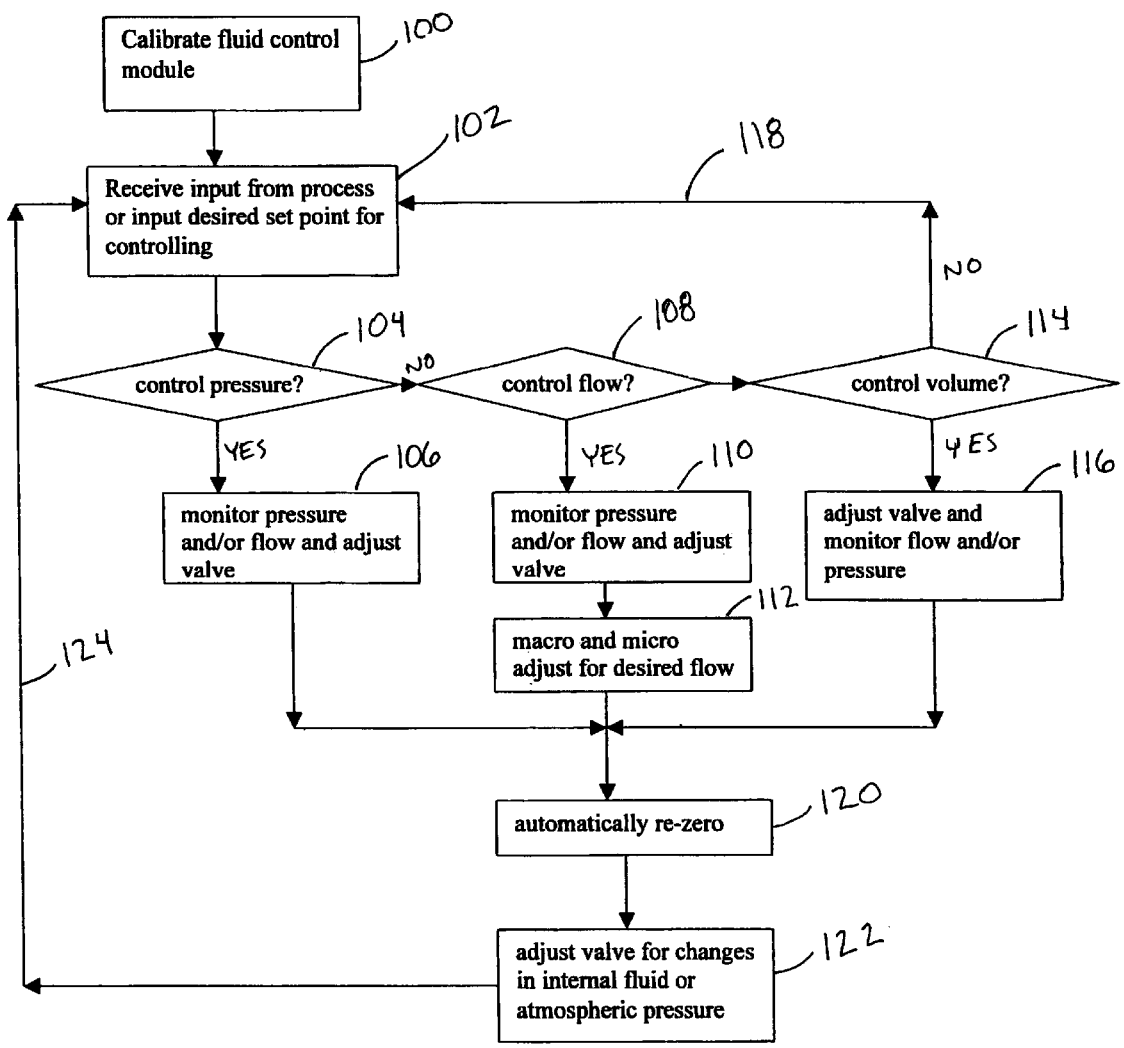
FIG. 9 is a flowchart showing a sequence the controller may implement to control the fluid control module of the present invention.

Having described the constructional features of the present invention the mode of use in conjunction with FIG. 9 will next be described. The controller 46 either automatically or when prompted by the user calibrates the pressure sensors 20 and control valve 22 (see block 100). During the calibration process, the controller creates and stores in memory values corresponding to valve position, flow rate and internal and external pressure for predetermined set points. Once the valve position, flow and pressure are known for desired set points, the controller may automatically set the valve position based on determined flow pressure or demand by the external process. Alternatively, the user may select a desired set point and the controller adjusts the valve position based on measured pressure and flow rates (see block 102). The controller then determines whether it is desired to control pressure (see decision block 104). If pressure is to be controlled, the controller monitors the pressure and/or flow rate and adjusts the valve to keep the pressure at a controlled amount (see block 106). If it is not desired to control pressure, the controller then determines whether it is desired to control flow (see decision block 108). If flow is to be controlled, the controller monitors pressure and/or flow and adjusts the valve to keep the flow rate at a controlled amount (see block 110).

The control may include a macro and micro adjust of the control valve, wherein the controller stores values associated with flow rate, pressure, temperature and valve position for the set points. When the flow, for example, is controlled the controller adjusts the valve to roughly approximate the valve position for prior measured pressure temperature and valve position for the desired flow (the macro adjust). Thus, the flow rate may be approximated rather quickly and then the control may make minor adjustments to the valve position to obtain an even more precise control of flow (see block 112). If volume is to be controlled (see decision block 114) then the flow rate and pressure are monitored and the valve is opened for a time sufficient to allow the controlled volume of fluid to pass past the control valve 22 (see block 116). If neither the pressure, flow or volume is to be controlled then the controller waits to receive input (see loop 118 and block 102).

During fluid processing, the controller 46 may automatically re-zero or calibrate the pressure sensors when the control valve 22 is closed (see block 120). Alternatively, a second dedicated valve may be provided which is operable in either an open or closed position. The controller may be programmed to re-zero the pressure sensors when the second dedicated valve is in the closed position. During processing, the pressure within the flow conduit may undergo significant changes, thereby requiring changes in the valve position to keep the flow rate, for example, constant (see block 122). The controller 46 waits to receive the next input (see loop 124 and block 102). Thus, the control module of the present invention eliminates the additional components and disadvantages of interconnecting individual pressure sensors and individual control valves.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A chemically inert fluid control module adapted to be connected with a fluid flow circuit, the fluid flow conduit conveying a process fluid, said module comprising:
    a chemically inert fluid conduit;
    an adjustable control valve coupled to the conduit, wherein a portion of the control valve that is exposed to process fluid is chemically inert;
    at least a first pressure sensor coupled to the conduit, wherein a portion of the first pressure sensor that is exposed to process fluid is chemically inert;
    a constriction disposed within said conduit, said constriction having a reduced cross-sectional area thereby restricting flow of fluid within the conduit; and
    a chemically inert housing enclosing said control valve and said first pressure sensor; wherein the control valve is controllable to set a selected fluid pressure, fluid flow rate, or fluid volume as desired responsive to pressure sensed by the first pressure sensor, wherein the chemically inert material of the conduit, first pressure sensor and housing includes a non-contaminating polymer.

2. The fluid control module as recited in claim 1, further including a second pressure sensor coupled to the conduit, wherein said constriction is positioned between said first and second pressure sensor.

3. The fluid control module as recited in claim 2, further including a controller coupled to said control valve and to said first and second pressure sensors.

4. The fluid control module as recited in claim 3, wherein said controller re-zeros said first and second pressure sensors when flow within said flow conduit stops.

5. The fluid control module as recited in claim 3, wherein said controller determines the pressure within the fluid conduit.

6. The fluid control module as recited in claim 3, wherein said controller determines the flow rate within the fluid conduit.

7. The fluid control module as recited in claim 6, wherein said controller adjusts a signal to compensate for a pressure differential present when the rate of flow is zero.

8. The fluid control module as recited in claim 1, wherein said constriction is positioned between said first pressure sensor and an area of constant pressure.

9. The fluid control module as recited in claim 1, wherein said control valve includes a chemically inert diaphragm.

10. The fluid control module as recited in claim 9, wherein said control valve further includes a second chemically inert diaphragm and a vent formed between the chemically inert diaphragms.

11. The fluid control module as recited in claim 1, wherein said control valve is driven by an actuator for actuating the valve between an open and closed position.

12. The fluid control module as recited in claim 1, wherein said control valve is pneumatically actuated.

13. The fluid control module as recited in claim 1, further including a controller coupled to said control valve and said pressure sensor.

14. The fluid control module as recited in claim 13, wherein the controller produces a signal proportional to the fluid flow rate within the fluid conduit.

15. The fluid control module as recited in claim 13, wherein the controller produces a signal proportional to the fluid pressure within the fluid conduit.

16. The fluid control module as recited in claim 13, wherein said controller compensates for changes in atmospheric pressure.

17. The fluid control module as recited in claim 13, wherein said controller includes a means for macro and micro adjustment of the control valve.

18. The fluid control module as recited in claim 13, wherein said controller adjusts a signal to compensate for a pressure differential present when a rate of flow is zero.

19. The fluid control module as recited in claim 1, wherein the portion of the pressure sensor exposed to fluid is comprised of sapphire.

20. The fluid control module as recited in claim 1, wherein the chemically inert material includes a fluoropolymer.

21. The fluid control module as recited in claim 20, wherein the fluoropolymer includes polytetrafluoroethylene (PTFE).

22. The fluid control module as recited in claim 1, wherein a chemically inert material includes a fluorocarbon polymer.

23. The fluid control module as recited in claim 1, wherein the constriction is formed integrally with said conduit.

24. The fluid control module as recited in claim 1, wherein said control valve includes a double chemically inert diaphragm with a vent formed therebetween.

25. The fluid control module as recited claim 1, wherein the constriction is positioned downstream from the first sensor and the first sensor is positioned downstream from the control valve.

26. A chemically inert fluid control module adapted to be connected within a fluid flow circuit, said module comprising:
- a chemically inert housing having a fluid conduit extending through said housing, said conduit having a constriction disposed within said conduit, said constriction having a reduced cross-sectional area thereby restricting flow within the conduit;
- means for sensing a pressure within the fluid conduit, wherein a portion of the means for sensing exposed to fluid is chemically inert; and
- means for controlling a size of an opening in a valve positioned within said fluid flow conduit, the valve being controllable to set a selected fluid pressure, fluid flow rate, or fluid volume as desired responsive to pressure sensed by the means for sensing, wherein a portion of the means for controlling exposed to fluid is chemically inert,
- said means for sensing and said means for controlling being contained integrally within said housing, wherein the chemically inert material of the housing, pressure sensing means and controlling means includes a non-contaminating polymer.

27. The fluid control module as recited in claim 26, wherein said means for sensing includes first and second pressure sensors coupled to the conduit, the conduit constriction being positioned between said first and second pressure sensors.

28. The fluid control module as recited in claim 27, further including a controller coupled to said means for controlling and said means for sensing.

29. The fluid control module as recited in claim 28, wherein said controller resets said means for sensing when flow within said flow conduit stops.

30. The fluid control module as recited in claim 28, wherein said controller determines the pressure within the fluid conduit.

31. The fluid control module as recited in claim 28, wherein said controller determines the flow rate within the fluid conduit.

32. The fluid control module as recited in claim 28, wherein said controller adjusts a signal to compensate for a pressure differential when the rate of flow is zero.

33. The fluid control module as recited in claim 28, wherein said controller includes a means for macro and micro adjustment of the means for controlling.

34. The fluid control module as recited in claim 26, wherein said valve includes a double chemically inert diaphragm.

35. The fluid control module as recited in claim 34, wherein said valve further includes a vent formed between the diaphragms of the double chemically inert diaphragm.

36. The fluid control module as recited in claim 26, wherein said valve includes a chemically inert diaphragm.

37. The fluid control module as recited in claim 26, wherein said means for controlling is driven by a means for actuating the valve between an open and closed position.

38. The fluid control module as recited in claim 26, wherein said means for controlling flow is driven pneumatically.

39. The fluid control module as recited in claim 26, further including a controller coupled to said means for controlling and said means for sensing.

40. The fluid control module as recited in claim 39, wherein said controller determines the pressure within the fluid conduit.

41. The fluid control module as recited in claim 39, wherein said controller determines the flow rate within the fluid conduit.

42. The fluid control module as recited in claim 39, wherein said controller compensates for changes in atmospheric pressure.

43. The fluid control module as recited in claim 26, wherein the portion of the means for sensing exposed to fluid is comprised of sapphire.

44. The fluid control module as recited in claim 26, wherein the chemically inert material includes a non-contaminating polymer comprised of polytetrafluoroethylene (PTFE).

45. A chemically inert fluid control module adapted to be connected with a fluid flow circuit, said module comprising:
- a chemically inert housing having a fluid conduit extending through said housing;
- a control valve coupled to the conduit, the control valve being controllable to set a selected fluid pressure, fluid flow rate, or fluid volume as desired responsive to a sensed pressure in the fluid conduit, wherein a portion of the valve exposed to fluid is chemically inert;
- a first pressure sensor coupled to the conduit and to the control valve, wherein a portion of the first pressure sensor exposed to fluid is chemically inert;
- a second pressure sensor coupled to the conduit and to the control valve, wherein a portion of the second pressure sensor exposed to fluid is chemically inert; and
- a constriction disposed within said conduit between said first and second pressure sensors, said constriction having a reduced cross-sectional area thereby restricting flow within the conduit, the first and second pressure sensors sensing pressures in the conduit on respective sides of the constriction, wherein the chemically inert material of the housing, conduit control valve, first and second pressure sensor and constriction includes a non-contaminating polymer.

46. The fluid control module as recited in claim 45, wherein said control valve includes a double chemically inert diaphragm.

47. The fluid control module as recited in claim 45, wherein said control valve includes a chemically inert diaphragm.

48. The fluid control module as recited in claim 45, wherein said control valve is driven by a means for actuating the valve between an open and closed position.

49. The fluid control module as recited in claim 45, wherein said control valve is driven pneumatically.

50. The fluid control module as recited in claim 45, further including a controller coupled to said control valve and said first and second pressure sensors.

51. The fluid control module as recited in claim 41, wherein said controller determines a pressure within the fluid conduit 41, wherein said controller determines a flow rate within the fluid conduit.

52. The fluid control module as recited in claim 50, wherein said controller determines the flow rate within the fluid conduit.

53. The fluid control module as recited in claim 50, wherein said controller compensates for changes in atmospheric pressure.

54. The fluid control module as recited in claim 50, wherein said controller resets said first and second pressure sensors when flow within said flow conduit stops.

55. The fluid control module as recited in claim 50, wherein said controller adjusts a signal to compensate for a pressure differential present when the rate of flow is zero.

56. The fluid control module as recited in claim 45, wherein the portion of the first and second pressure sensors exposed to fluid is comprised of sapphire.

57. The fluid control module as recited in claim 45, wherein the chemically inert material includes a non-contaminating polymer comprised of polytetrafluoroethylene (PTFE).

58. A chemically inert fluid control module adapted to be connected with a fluid flow circuit, the fluid flow conduit conveying a process fluid, said module comprising:

a chemically inert fluid conduit;

an adjustable control valve coupled to the conduit, wherein a portion of the control valve that is exposed to process fluid is chemically inert;

at least a first pressure sensor coupled to the conduit, wherein a portion of the first pressure sensor that is exposed to process fluid is chemically inert;

a constriction disposed within said conduit, said constriction having a reduced cross-sectional area thereby restricting flow of fluid within the conduit; and a chemically inert housing enclosing said control valve and said first pressure sensor;

wherein the control valve is controllable to set a selected fluid pressure, fluid flow rate, or fluid volume as desired responsive to pressure sensed by the first pressure sensor.

59. The fluid control module as recited in claim 58, wherein the chemically inert material includes a ceramic material.

60. The fluid control module as recited in claim 59, further comprising a second pressure sensor coupled to the conduit, wherein said constriction is positioned between said first and second pressure sensors.

61. The fluid control module as recited in claim 60, wherein the chemically inert material includes a non-contaminating polymer comprised of polytetrafluoroethylene (PTFE).

62. The fluid control module as recited in claim 58, wherein the constriction is formed integrally with said conduit.

63. The fluid control module as recited in claim 58, wherein said control valve includes a double chemically inert diaphragm with a vent formed therebetween.

64. The fluid control module as recited in claim 58, wherein the constriction is positioned downstream from the first sensor and the first sensor is positioned downstream from the control valve.

65. The fluid control module as recited in claim 58, wherein the chemically inert material includes a non-metal material.

66. A chemically inert fluid control module adapted to be connected with a fluid flow circuit, the fluid flow conduit conveying a process fluid, said module comprising:

a chemically inert fluid conduit;

an adjustable control valve coupled to the conduit, wherein a portion of the control valve that is exposed to process fluid is chemically inert;

at least a first sensor coupled to the conduit, wherein a portion of the first sensor that is exposed to process fluid is chemically inert; and a chemically inert housing enclosing said control valve and said first sensor, wherein the chemically inert material of the conduit, control valve, first sensor and housing includes a non-contaminating polymer.

67. The fluid control module as recited in claim 66, wherein the polymer includes a fluoropolymer comprising polytetrafluoroethylene (PTFE).

68. The fluid control module as recited in claim 66, wherein the control valve further includes two chemically inert diaphragms with a vent formed therebetween.

69. The fluid control module as recited in claim 66, wherein a constriction is positioned within said conduit downstream from the first sensor and the first sensor is positioned downstream from the control valve.

70. The fluid control module as recited in claim 69, further comprising a second sensor coupled to the conduit and positioned downstream from the constriction.

71. The fluid control module as recited in claim 66, further comprising a constriction disposed within said conduit, said constriction having a reduced cross-sectional area thereby restricting flow of fluid within the conduit.

\* \* \* \* \*